(12) United States Patent
Weiss et al.

(10) Patent No.: US 8,346,215 B2
(45) Date of Patent: Jan. 1, 2013

(54) RETROSPECTIVE IMPLEMENTATION OF SIM CAPABILITIES IN A SECURITY MODULE

(75) Inventors: Dieter Weiss, München (DE); Wolfgang Rankl, München (DE)

(73) Assignee: Giesecke & Devrient GmbH, Munich (DE)

( * ) Notice: Subject to any disclaimer, the term of this patent is extended or adjusted under 35 U.S.C. 154(b) by 1111 days.

(21) Appl. No.: 11/922,891

(22) PCT Filed: Jul. 10, 2006

(86) PCT No.: PCT/EP2006/006734
§ 371 (c)(1),
(2), (4) Date: Apr. 30, 2008

(87) PCT Pub. No.: WO2007/006535
PCT Pub. Date: Jan. 18, 2007

(65) Prior Publication Data
US 2009/0124287 A1 May 14, 2009

(30) Foreign Application Priority Data
Jul. 11, 2005 (DE) .......................... 10 2005 032 311

(51) Int. Cl.
*H04M 1/66* (2006.01)
(52) U.S. Cl. ........................................ 455/411; 455/410
(58) Field of Classification Search ........... 455/410–411
See application file for complete search history.

(56) References Cited

U.S. PATENT DOCUMENTS

| 5,557,679 | A | 9/1996 | Julin et al. | |
| 6,799,155 | B1 * | 9/2004 | Lindemann et al. | 703/24 |
| 2003/0021413 | A1 * | 1/2003 | Kiiveri et al. | 380/247 |
| 2003/0190908 | A1 * | 10/2003 | Craven | 455/411 |
| 2003/0211842 | A1 * | 11/2003 | Kempf et al. | 455/411 |

(Continued)

FOREIGN PATENT DOCUMENTS
EP 0 920 684 B1 3/2000
(Continued)

OTHER PUBLICATIONS

"Universal Mobile Telecommunications System (UMTS); Characteristics of the USIM application (3GPP TS 31.102 version 6.10.0 Release 6); ETSI TS 131 102", ETSI Standards, European Telecommunications Standards Institute, Sophia-Antipo, FR, vol. 3-T3, No. V6100, Jun. 2005 (XP014030679).

(Continued)

*Primary Examiner* — Steven Lim
(74) *Attorney, Agent, or Firm* — Bacon & Thomas, PLLC

(57) ABSTRACT

The invention relates to a method for subsequently implementing a SIM functionality, with the help of which a mobile telephone (1) is enabled to use a mobile radio network, in a security module (3). Within the context of the method according to the invention the SIM functionality is realized in the form of an application, of which at least a first part is loaded into the security module (3). Furthermore, personalizing data, which are required for a use of the mobile radio network by the mobile telephone (1), are transmitted from a provider (2) to the security module (3) in encrypted form on the direct or indirect way. The encrypted personalizing data are decrypted by the security module (3) by means of a secret key of a user stored in the security module (3). The security module (3) is personalized by means of the decrypted personalizing data.

13 Claims, 1 Drawing Sheet

U.S. PATENT DOCUMENTS

| | | | | |
|---|---|---|---|---|
| 2003/0221104 A1* | 11/2003 | Baessler | | 713/175 |
| 2004/0053642 A1* | 3/2004 | Sandberg et al. | | 455/558 |
| 2005/0083846 A1* | 4/2005 | Bahl | | 370/236 |
| 2005/0108534 A1 | 5/2005 | Bajikar et al. | | |
| 2005/0136964 A1* | 6/2005 | Le Saint et al. | | 455/522 |

FOREIGN PATENT DOCUMENTS

| | | |
|---|---|---|
| EP | 0 981 803 B1 | 1/2002 |
| GB | 2 387 505 A | 10/2003 |
| WO | WO 03/077585 A1 | 9/2003 |

OTHER PUBLICATIONS

Pearson S, "How Trusted Computers can Enhance for Privacy Preserving Mobile Applications" World of Wireless Mobile and Multimedia Networks, 2005. WOWMOM 2005. Sixth IEEE International Symposium on a Taormina-Giardini Maxos, Italy Jun. 13-16, 2005, Piscataway, NJ, USA, IEEE, Jun. 13, 2005, pp. 609-613 (XP010811156).

* cited by examiner

RETROSPECTIVE IMPLEMENTATION OF SIM CAPABILITIES IN A SECURITY MODULE

BACKGROUND

The invention relates to a method for subsequently implementing a SIM functionality, with the help of which a mobile telephone is enabled to use a mobile radio network, in a security module.

Mobile phones usually are provided with a telecommunication card, which is formed as a chip card inserted in the mobile telephone. Such a chip card has the format ID-1 or ID-000 according to the international standard ISO 7810. Here a combination of the stated formats is often used, namely by integrating a card body of the ID-000 format as a break-off part into a card body of the ID-1 format and the chip being disposed in the area of the ID-000 card body.

The telecommunication card in particular serves for furnishing proof towards a mobile telephone service provider of an access authorization to the mobile radio network and is also referred to as subscriber identity module, abbreviated SIM. A definite subscriber identity is stored in the telecommunication card which is also referred to as international mobile subscriber identity, abbreviated IMSI. The subscriber identity is written into the telecommunication card within the framework of a personalization, which is carried out in a secure surrounding, before the telecommunication card is handed out to the user.

Based on the subscriber identity the mobile radio system can carry out an authentication and ascertain thereby, whether the mobile telephone is authorized to use the mobile radio system. In addition, the subscriber identity is necessary for allocating to the user of the mobile telephone, for example, the call charges charged for a telephone call.

Furthermore, the telecommunication card is provided with a number of further functions. These functions permit, for example, the storage of short messages, the storage of the latest dialed telephone number for a last number redial, the storage of telephone numbers in a personal telephone directory or the storage of abbreviated numbers with which the dialing operation is facilitated for frequently used telephone numbers etc.

From EP 0 920 684 B1 a method for the read-out and read-in of data is known which are stored on a chip card that has a microprocessor, a memory and an additional memory. The additional memory can be read out and written into in a manner which bypasses the operating system.

EP 0 981 803 B1 discloses a method for performing an electronic personalization and/or initialization of a chip card. The personalization and/or initialization is effected with the help of a first apparatus which contacts the chip card and a second apparatus which is in a data link with the chip card via the first apparatus.

U.S. Pat. No. 5,557,679 discloses a method for personalizing a SIM card. The card is introduced in a card reader, which via a communication network is connected with a central computer. The IMSI and an authentication key are transmitted in encrypted form from the central computer to the card reader. The card reader decrypts the received data and passes them on to the card in a manner which prevents a spy-out. This can be achieved, for example, by a double encryption of the data and performing a decryption within the card.

SUMMARY

The invention is based on the problem to permit a use of a mobile telephone as flexible and comfortable as possible.

With the method according to the invention a SIM functionality, with the help of which a mobile telephone is enabled to use a mobile radio network, is subsequently implemented in a security module. For this purpose the SIM functionality is realized in the form of an application, at least a first part of which is loaded into the security module. Furthermore, personalizing data required for a use of the mobile radio network by the mobile telephone, are transmitted from a provider to the security module in encrypted form on the direct or indirect way. The encrypted personalizing data are decrypted by the security module with the help of a secret key of a user stored in the security module. With the help of the decrypted personalizing data the security module is personalized.

The method according to the invention offers a high flexibility, since the SIM functionality can be subsequently implemented in any desired security module, as long as such security module meets certain minimum requirements in view of security and the resources required. Subsequently within the terms of the invention means that the SIM functionality is not implemented in the security module already within the framework of manufacturing or an initialization or personalization following the manufacturing. The implementation of the SIM functionality is not effected until a later point of time, at which the security module has already been delivered to a dealer or has been handed out to the user.

A further advantage of the method according to the invention is that the implementation can be carried out at any time and the user is largely independent with respect to the provider he chooses. The effort for the implementation is small and the requirements of a high security standard are still met.

Preferably, the first part of the application comprises security-relevant operations. With that a high security standard is achieved, because the security module is protected against manipulations. A second part of the application can be loaded into the mobile telephone. Thereby, the normally very limited resources of the security module can be saved. But it is also possible to completely load the application into the security module.

The encrypted personalizing data can be transmitted upon a respective inquiry which the user directs to the provider. Here it is advantageous, when the inquiry contains the public key of the user and/or a user identification, which in particular is encrypted with a public key of the provider. With that the provider is in the position to encrypt security-relevant data in such a way that they can be decrypted only by the user. The inquiry can contain a further identification, on the basis of which a service contingent is allocated to the user.

The secret key of the user can already be stored in the security module on handing out the security module to the user. This has the advantage that measures, by which a key is generated or transmitted to the security module at a later point of time, are not required. Likewise, it is also possible, that the secret key of the user is generated and stored in the security module after the handing out of the security module to the user. With that the risk of a spy-out of the key is reduced. The secret key of the user in particular can be generated by the security module. In this way a very high security standard can be achieved, because the secret key at no time leaves the security module. It is especially advantageous, when the secret key of the user is generated together with the public key of the user as a key pair. It is possible to generate such key pairs with a comparatively low effort.

The data transmission between the security module and the provider can be effected via an air interface of the mobile telephone or an online connection set up via any other device. Here the use of the air interface has the advantage, that an additional device is not necessary.

As a security module preferably a data carrier different from a chip card of the format ID-1 or ID-000 of the standard ISO 7810 is used. These formats correspond to the telecommunication cards usually used in mobile phones, which are also referred to as SIM cards. Therefore, the invention primarily relates to a form of the security module that deviates from that what is usual with mobile phones. In particular, a trusted platform module or a secure multimedia card is used as a security module.

BRIEF DESCRIPTION OF THE DRAWINGS

In the following the invention is explained in detail with reference to the embodiments represented in the Figure.

DETAILED DESCRIPTION OF VARIOUS EMBODIMENTS

Figure 1:
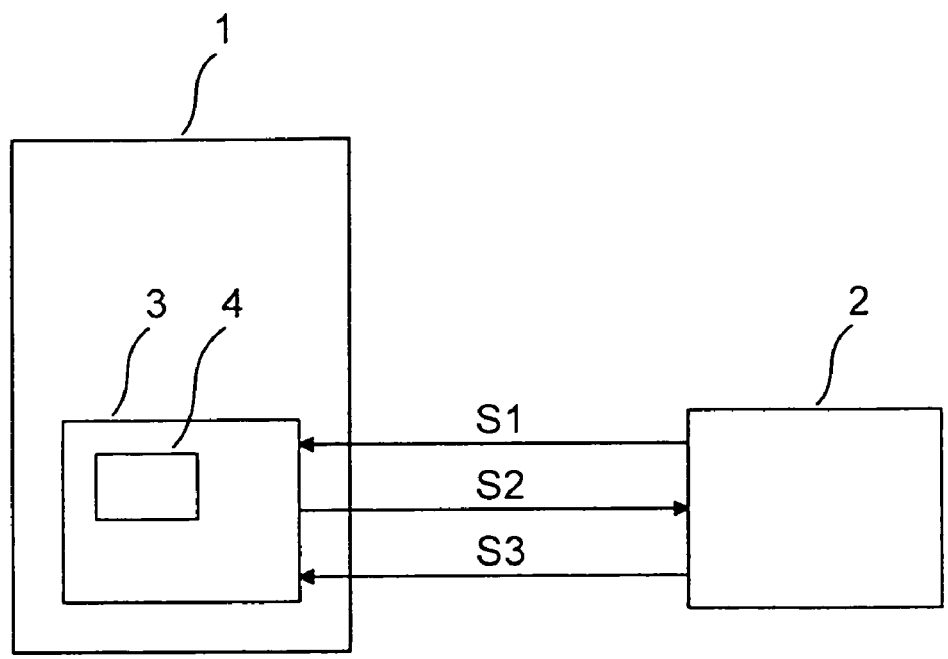
FIG. 1 shows a schematic representation of a first variant of the method according to the invention and FIG. 2 shows a schematic representation of a second variant of the method according to the invention.

FIG. 1 shows a schematic representation of a first variant of the method according to the invention. There are displayed a mobile telephone 1 and a provider 2 that offers access to a mobile radio network. The mobile telephone 1 has a secure multimedia card (SMMC) 3, which is inserted in the mobile telephone 1. The construction of the mobile telephone 1 itself is known and not shown in more detail in FIG. 1.

The secure multimedia card 3 represents a compact electronic storage medium, which is formed in a card-shaped manner. A part of the storage capacity of the secure multimedia card 3 is realized in the form of a memory 4 safe from access. In the memory 4 are stored a public key and a secret key. The public key is abbreviated with PK. The secret key is abbreviated with SK. The public key PK and the secret key SK, for example, are generated as a key pair and stored in memory 4 of the secure multimedia card 3 before the handing out of the secure multimedia card 3 to a user. Likewise, it is also possible to generate such a key pair and to store it in memory 4 of the secure multimedia card 3 after the handing out of the secure multimedia card 3. In addition to the pure storage function the secure multimedia card 3 is able to execute algorithms safe from manipulations. With that it is possible, for example, that the key pair is generated by the secure multimedia card 3 itself.

In addition to the shown secure multimedia card 3 the mobile telephone 1 can have a not figuratively shown telecommunication card, which is also referred to as subscriber identity module, abbreviated SIM. Such a telecommunication card is formed as a chip card of the format ID-1 or ID-000 predetermined by the international standard ISO 7810. The telecommunication card serves for proving an access authorization to a mobile radio network and to thereby provide the mobile telephone 1 with an access to the mobile radio network. For this purpose in the telecommunication card is stored a definite user identification, which is referred to as international mobile subscriber identity, abbreviated IMSI. The mobile telephone 1 can also be operated without the telecommunication card, because within the scope of the invention the functionality of the telecommunication card is assumed by the secure multimedia card 3. In the following the functionality of the telecommunication card is referred to as SIM functionality. For providing secure multimedia card 3 with the SIM functionality, the process is as follows:

At first in a transmission step S1 the SIM functionality is transmitted from provider 2 to secure multimedia card 3 in the form of an application, i.e. a software which emulates the mode of functioning of the telecommunication card, and the transmitted application is loaded into the secure multimedia card 3. The transmission of the application for example can be effected with the help of an online connection between a server of the provider 2 and a personal computer of the user. Likewise, the transmission can also be effected from the provider 2 to a dealer who then loads the application into the secure multimedia card 3 of the user. Furthermore, it is possible that the application is transmitted from provider 2 to mobile telephone 1, in which is located the secure multimedia card 3. For transmitting the application security measures are not required, because it does not contain any secret data.

Subsequent to transmission step S1 a transmission step S2 is executed, in which the public key PK stored in the memory 4 of the secure multimedia card 3 and an identification number ID are transmitted from the secure multimedia card 3 to the provider 2. For the transmission the same transmission paths as for transmission step S1 are available. The identification number ID can also be stored in the memory 4 of the secure multimedia card 3 and preferably is transmitted in encrypted form. The encryption in particular is carried out by the secure multimedia card 3, wherein as a key a public key of provider 2 can be used. In a development of the method according to the invention in addition to the identification number ID a further number is transmitted to provider 2. This further number for example represents a certain number of short messages (SMS), which the user can send free of charge. The further number can be handed over to the user for example by means of a scratch card as an advertising gift.

As a reaction to transmission step S2 in a transmission step S3 the provider 2 transmits personalizing data to the secure multimedia card 3, which are encrypted with the public key PK of the user sent in transmission step S2. The personalizing data in particular contain an IMSI. For the transmission step S3, too, the already mentioned transmission paths are available. The execution of the transmission step S3 can be made conditional on that the provider 2 has received a corresponding request from the user.

The secure multimedia card 3 decrypts the received personalizing data and autonomously carries out a personalization. After the personalization has been properly carried out the secure multimedia card 3 can be used like a telecommunication card, i.e. it is provided with the already mentioned SIM functionality. For example, with mobile telephone 1 telephone calls can be made, without a telecommunication card being additionally required therefor. When the SIM functionality of the secure multimedia card 3 is used, the application loaded in transmission step S1 is executed by the secure multimedia card 3 itself, which herefor can access the data stored within the framework of the personalization. Alternatively, it is also possible, that the secure multimedia card 3 executes only security-relevant parts of the application and the rest of the application is executed by the mobile telephone 1. But herefor it is required that the implementation of the SIM functionality is carried out in a modified form. This is explained with reference to FIG. 2 in more detail.

In order to protect the application transmitted in transmission step S1 against being used by unauthorized third parties, it can be transmitted in a fashion encrypted with the public key PK of the user. In this case the transmission is effected not until after the receipt of this public key PK on the part of the provider 2.

Figure 2:
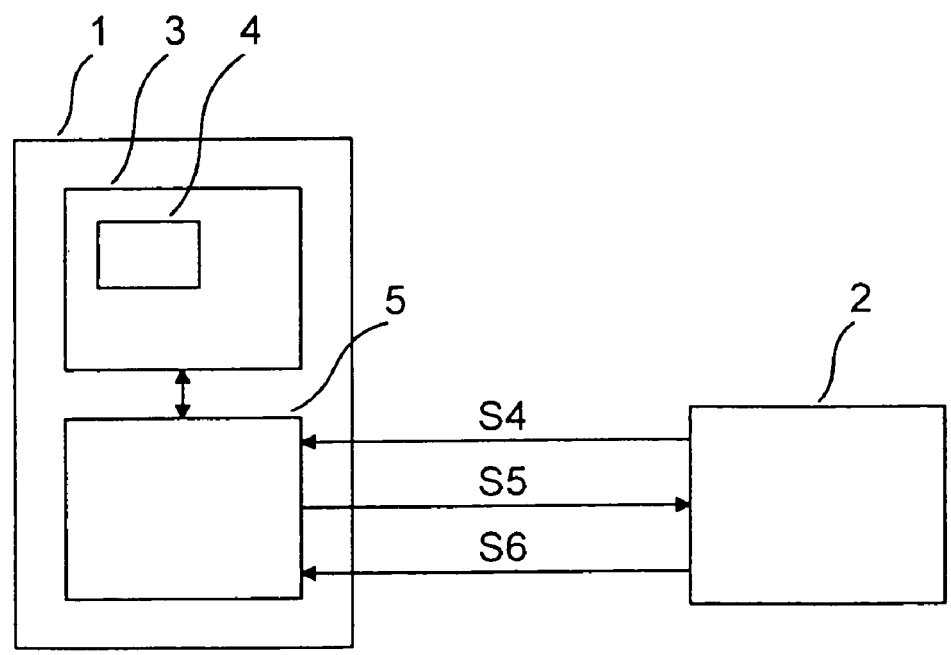

FIG. 2 shows a schematic representation of a second variant of the method according to the invention. In the second variant the implementation of the SIM functionality is carried out in such a way that later, when the SIM functionality is used, the application is executed partly by mobile telephone 1 and partly by secure multimedia card 3. For the execution of the application the mobile telephone 1 has an application processor 5, which also executes other applications of the mobile telephone 1 and therefore is also provided in mobile telephone 1 according to FIG. 1. But therein the application processor 5 of the mobile telephone 1 is not important for the invention and thus not displayed. Between application processor 5 and secure multimedia card 3 there is a data link.

In the second variant of the method according to the invention in a transmission step S4 the application, which comprises the SIM functionality, is transmitted from provider 2 to the application processor 5 of the mobile telephone 1. In application processor 5 those parts of the application are stored, which later are executed by application processor 5. The other parts of the application, which are to be executed by the secure multimedia card 3, are passed on to secure multimedia card 3 by application processor 5 and stored there. For example, in the secure multimedia card 3 a GSM algorithm is stored, with the help of which the mobile telephone 1 logs itself on to the mobile radio network. GSM here stands for global system for mobile communications.

Following the transmission step S4 a transmission step S5 is carried out, in which the public key PK and the identification number ID of the user are transmitted from the application processor 5 of the mobile telephone 1 to the provider 2. For this purpose these data are provided in a fashion already described with the first method variant. Thereafter a transmission step S6 is carried out, in which provider 2 transmits the personalizing data encrypted with the public key of the user to the application processor 5. Application processor 5 passes on the encrypted personalizing data to the secure multimedia card 3, which the secure multimedia card 3 decrypts and uses for carrying out a personalization.

The transmission paths of the second method variant can be formed like in the first method variant, here, optionally, the application processor 5 additionally having to be taken into consideration. As for the rest, the explanations for the first method variant analogously apply to the second method variant, if nothing different is described.

With the implementation of the SIM functionality according to the second method variant, too, the secure multimedia card 3 then can be used for enabling the mobile telephone 1 to access the mobile radio network. But, however, the secure multimedia card 3 does not provide the entire SIM functionality, but only its security-relevant parts. As for the rest, the SIM functionality is realized in the application processor 5 of the mobile telephone 1.

The above explanations equally apply to the UMTS field. UMTS stands for universal mobile telecommunication system and refers to a special communication standard. Instead of the SIM then a USIM (universal subscriber identity module) is used.

The method according to the invention can also be used for data carriers different from a secure multimedia card 3. For example, other memory cards for electronic devices are possible, if they ensure a sufficient security and are able to execute an application. In particular, a trusted platform module is also suitable, whose primary task it is to prove the authenticity of an electronic device and which is available in different realization forms.

The invention claimed is:

1. A method for subsequently implementing a SIM functionality, with which a mobile telephone is enabled to use a mobile radio network, in a security module, comprising the steps of:
   providing the SIM functionality in the form of an application, of which at least a first part is loaded into the security module,
   transmitting from a service provider to the security module in encrypted form in a direct or indirect way personalizing data, which are required for a use of the mobile radio network by the mobile telephone, to implement the SIM functionality in the security module,
   decrypting by the security module the encrypted personalizing data by means of a secret key of a user stored in the security module, and
   personalizing the security module with the decrypted personalizing data.

2. The method according to claim 1, wherein the first part of the application comprises security-relevant operations.

3. The method according to claim 2, wherein a second part of the application is loaded into the mobile telephone.

4. The method according to claim 1, wherein the encrypted personalizing data are transmitted upon a respective inquiry, which the user directs to the provider.

5. The method according to claim 4, wherein the inquiry contains a further identification, on the basis of which a service contingent is allocated to the user.

6. The method according to claim 1, wherein the secret key of the user is already stored in the security module when the security module is handed out to the user.

7. The method according to claim 1, wherein the secret key of the user is generated and stored in the security module after the security module has been handed out to the user.

8. The method according to claim 7, wherein the secret key of the user is generated by the security module.

9. The method according to claim 7, wherein the secret key of the user is generated together with the public key of the user as a key pair.

10. The method according to claim 1, wherein the data transmission between the security module and the provider is effected via an air interface of the mobile telephone or an online connection set up via another device.

11. The method according to claim 1, wherein as a security module a data carrier different from a chip card of the format ID-1 or ID-000 of the standard ISO 7810 is used.

12. The method according to claim 1, wherein as a security module a trusted platform module or a secure multimedia card is used.

13. A method for subsequently implementing a SIM functionality, with which a mobile telephone is enabled to use a mobile radio network, in a security module, comprising the steps of:
   providing the SIM functionality in the form of an application, of which at least a first part is loaded into the security module,
   transmitting from a service provider to the security module in encrypted form in a direct or indirect way personalizing data, which are required for a use of the mobile radio network by the mobile telephone, to implement the SIM functionality in the security module,
   decrypting by the security module the encrypted personalizing data by means of a secret key of a user stored in the security module, and
   personalizing the security module with the decrypted personalizing data;
   wherein the encrypted personalizing data are transmitted upon a respective inquiry, which the user directs to the service provider;
   wherein the inquiry contains one or both the public key of the user or a user identification, which is encrypted with a public key of the service provider.

* * * * *